United States Patent [19]

Harper et al.

[11] Patent Number: 4,808,681

[45] Date of Patent: Feb. 28, 1989

[54] CONDUCTIVE POLY(2,5-FURANYLENE VINYLENE) AND POLY(2,5-THIENYLENE VINYLENE)

[75] Inventors: Kevin Harper, Pontefract; William J. W. Watson, Hampton, both of England

[73] Assignee: The British Petroleum Company PLC, London, England

[21] Appl. No.: 13,144

[22] Filed: Feb. 11, 1987

Related U.S. Application Data

[63] Continuation of Ser. No. 797,447, Nov. 13, 1985, abandoned.

[30] Foreign Application Priority Data

Nov. 17, 1984 [GB] United Kingdom ................ 8429111

[51] Int. Cl.$^4$ .................. C08G 61/00; C08G 83/00
[52] U.S. Cl. .................. 526/270; 252/500; 526/257; 528/380; 528/417
[58] Field of Search .................. 526/270; 528/417

[56] References Cited

U.S. PATENT DOCUMENTS 3,686,141 8/1972 Bracke ........................ 525/328.1

*Primary Examiner*—Christopher Henderson
*Attorney, Agent, or Firm*—Brooks Haidt Haffner & Delahunty

[57] ABSTRACT

This invention relates to novel conductive thienylene- and furanylene-vinylene polymers and to a process for their preparation. The polymer can be formed into coherent films in which no voids are visible upto magnifications of upto 5000 times. These polymers have band gaps below 2 eV which makes them more suitable than conventional polyphenylene and poly(phenylene vinylene) polymers for use e.g. in batteries.

3 Claims, No Drawings

CONDUCTIVE POLY(2,5-FURANYLENE VINYLENE) AND POLY(2,5-THIENYLENE VINYLENE)

This application is a continuation of application Ser. No. 797,447, filed Nov. 13, 1985, now abandoned.

The present invention relates to novel polymers and a process for producing the same. More specifically, the polymers of this invention are novel heterocyclic vinylenes particularly suitable for use as conductive materials.

Aromatic polymers containing long conjugated chains have received considerable attention because of their actual or potential conductivities and their desirability for use as conductors or semi-conductors. Much work has been performed on the preparation of aromatic polymers such as poly(phenylene), poly(phenylene vinylene) and their analogues which typically have band gaps above 2.5 eV and are less suitable for electronic and electrochemical uses than those with band gaps below 2 eV. Poly(thienylene vinylenes) have also been formed by direct synthesis routes as explained below.

In a paper entitled "Thiophene and Benzene Units Containing Polyenes via the Wittig Reaction" by G. Kossmehl et. al. in Kinet. Mech. Polyreactions, Int. Symposium Macromol. Chem. Prepn. (1969) pp 135-139, oligomers of poly(thienylene vinylenes) were prepared by the well known Wittig route. However, these oligomers had low molecular weights (of the order of 1000 to 1600) with about 5 or less repeating thiophene units.

In another paper entitled "Struktur und Elektrische Leitsahigkeit von Polymeren Organischen Halbleitern" by Von Manfred Hartel et al in Angew. Makromol. Chem. (1973), pp 29-30 and 307 oligomers of thienylene vinylenes which has up to 5 repeat units of the corresponding monomer.

However they have failed to prepare high molecular weight heterocyclic polymers. Since the Wittig reaction is a condensation reaction, high molecular weight intractable polymers cannot be normally prepared. During condensation reactions, low molecular weight oligomers precipitate out of solution before they can be further polymerised. Thus, they have only prepared oligomers which have less than about 10 repeating units rather than high molecular weight polymers.

Moreover, these prior oligomers are highly intractable powders which cannot be processed further to form films.

U.S. Pat. No. 3,706,677 assigned to Dow Chemical Company discloses poly(phenylene vinylene) polymers and their preparation from sulphonium salts. There is no suggestion for the preparation of heterocyclic vinylenes in its teaching.

The present invention provides high molecular weight heterocyclic polymers with band gaps below 2.5 eV which are conductive and can be doped to improve their conductivity, and which can be cast into desired shapes such as coherent films or fibres. The polymers herein are particularly suitable for use in conductor and semi-conductor applications.

Accordingly, the present invention provides a polymer of the general formula (I):

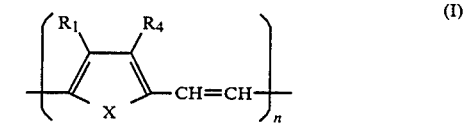

wherein
X is a sulphur or an oxygen atom
$R_1$ and $R_4$ are the same or different substituents selected from H, a $C_1$-$C_4$ alkyl, a nitrile, a halide, a trihalomethyl and a phenyl group, and
n has a value greater than 10.

In a further embodiment of this invention, a precursor polymer useful for preparing conductive polymers is provided having the general formula (II):

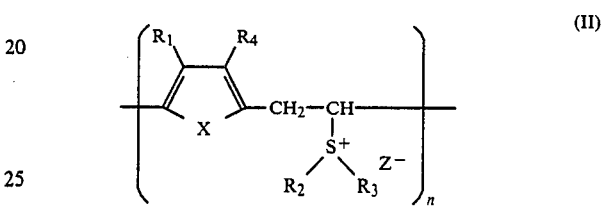

wherein X, $R_4$, $R_1$ and n are as defined in formula (I) above, $R_2$ and $R_3$ are independently $C_1$ to $C_4$ alkyls or H, and $Z^-$ is an anion.

In another embodiment, the invention is a coherent film of a polymer of formula (I).

In still another embodiment, the invention is a fibre of the polymer of formula (I).

In yet another embodiment, polymers of formula (I) are prepared by a process comprising;

(1) contacting a 2,5-bis-methylene halide substituted thiophene or furan with a sulphide compound of the formula $R_2R_3S$, wherein $R_2$ and $R_3$ are independently H or an alkyl or together with the sulphur atom form a heterocyclic ring, to form a bis-sulphonium salt, (2) polymerising the bis-sulphonium salt in the liquid phase in the presence of a base to form a precursor polymer, (3) separating a solution of the precursor polymer from the reaction mixture and recovering the precursor polymer from said solution, and (4) thermally decomposing the recovered precursor polymer (II) to form a final polymer of formula (I).

The heterocyclic monomers used to prepare the novel polymers herein contain as the heteroatom sulphur or oxygen in the five member-heterocyclic ring (i.e. thiophene or furan) and have two methylene halide substituents in a position ortho- to the hetero atom. The substituents, $R_1$ and $R_4$ on the heterocyclic ring can be any group which does not interfere with the polymerisation of the monomer.

Preferably, the substituents $R_1$ and $R_4$ are the same or different and are selected from H; an alkyl group having from 1 to 4 carbon atoms such as methyl, ethyl, propyl or butyl; a carbonitrile group; a halide group; a trihalomethyl group such as $CF_3$ or $CCl_3$; and a phenyl group.

Typically, the polymers of this invention have molecular weights of greater than about 2,000 and preferably greater than 5,000. Thus, referring to polymers of formula (I), n is suitably a number from 20 to 20,000, preferably from 50 to 1,000 and most preferably from 100 to 500.

The polymers of this invention are prepared from bis-sulphonium salt intermediates of the bis-methylene halide substituted heterocyclic monomers which are polymerised into the precursor polymer (II). The precursor polymer is then cast into a desired shape, preferably a film or a fibre, and converted to the final polymer (I) of the present invention by thermal elimination. Thus, this process allows for the preparation of films or fibres of the precursor polymer (II) and the subsequent conversion of the precursor polymer films or fibres to films or fibres of the final polymer (I).

This process is believed to occur according to the following reaction scheme:

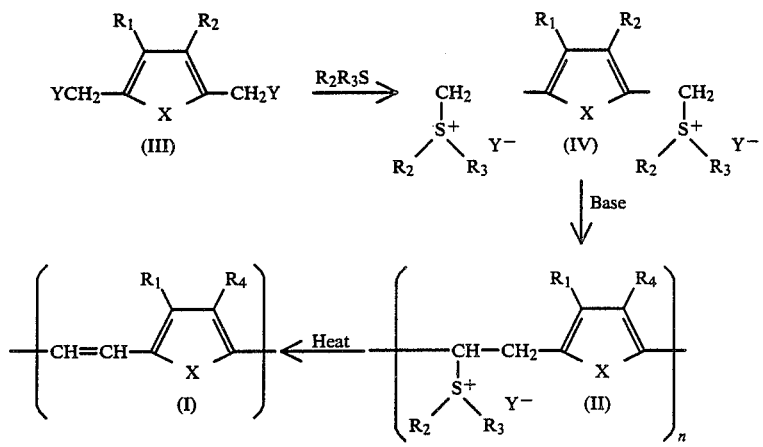

In this scheme the notation Y represents a halogen atom or halide ion as appropriate. Where it is a halide the ion $Y^-$ may be exchanged for other ions in compounds (II) and (IV).

The compound of formula (III) can be prepared by conventional techniques known to those skilled in the art such as halomethylation of a heterocyclic or substituted heterocyclic compound or by halogenation of a methyl substituted heterocyclic compound.

A solution of the compound of formula (III) is then contacted with a dialkyl sulphide to form its corresponding bis-salt under an atmosphere inert under the reaction conditions and ambient temperatures. The resulting product is then polymerised in the presence of a base such as LiOH, NaOH, KOH or a strong organic nitrogen containing base at subambient temperatures, typically from $-10°$ to $10°$ C., and in an atmosphere inert under the reaction conditions to form the precursor polymer (II). It is preferable to use a strong organic nitrogen containing base which upon reaction with the bis-salt gives rise to a quaternary ammonium halide which is insoluble in the reaction medium. The particular advantage of using such a base is that the precursor polymer (II), which remains in solution, is free from the salts of hydrogen halide eliminated during the base polymerisation step. The presence of halide salts may give rise to erroneous results during conductivity measurements in the final polymer. Typical examples of the strong organic nitrogen containing bases are the amidine type bases having the grouping:

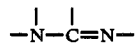

Specific examples of amidines which are particularly suitable include 1,5,7-triazabicyclo[4.4.0]dec-5-ene (hereafter referred to as 'TBD') and 1,8-diazabicyclo[5.4.0]undec-7-ene.

These bases are preferably used in a form which facilitates the separation of corresponding ammonium salts as solids from the reaction mixture. Thus the bases may be supported on a polymer e.g. polystyrene backbone during use in the polymerisation reaction. This will enable the solution of the precursor polymer (II) to be separated from the reaction by-products which remain in solid form. On the other hand if a base such as an alkali metal hydroxide is used then the precursor polymer (II) is isolated and purified to remove low molecular weight materials and reaction by-products by a suitable technique such as by dialysis and/or ion-exchange techniques.

It is preferable to use the sulphide $R_2R_3S$ in which each of the groups $R_2$ and $R_3$ are either $C_1$ to $C_4$ alkyl groups or together form a ring such that the sulphide is e.g. tetrahydrothiophene.

The halide anion $Y^-$ can be any halide such as $Cl^-$, $Br^-$ or $I^-$.

Optionally, the halide anion $Y^-$ in the sulphonium salt can be substituted by anion methathesis for other anions such as $BF_4^-$, $PF_6^-$ and the like.

Organic solvents or water have been found to be suitable for the synthesis of the monomers used in the present invention. Examples of suitable solvents include hydrocarbons, halogenated hydrocarbons, alcohols, ethers, esters and ketones with benzene and halogenated hydrocarbons such as chloroform being preferred. Aqueous or alcoholic solvents are preferred as the medium for the polymerisation of the monomers. Mixtures of organic and aqueous solvents may also be used depending upon the reactants employed.

The heterocyclic monomer is polymerised as described above to form the precursor polymer (II). Once the precursor polymer has been prepared, it can be either solvent cast (e.g. spin cast) into films or other desired shapes or drawn into fibres and then conveniently converted to the final polymer (I). Typically, the precursor polymer is dissolved in a suitable polar solvent such as methanol, water, or dimethyl formamide. The casting process is conducted in an inert atmosphere or under vacuum with the solution being placed on a suitable substrate e.g. glass or sodium bromide discs for casting into a film or drawn into a fibre directly from solution. Glass substrates are preferred when the precursor polymer to be cast is in aqueous solution.

Once the precursor polymer (II) is in the desired shape, it is converted into the final polymer (I) of the present invention by the thermal elimination of the sulphide and the HZ compounds. This can be accomplished by heating the precursor polymer (II) at elevated temperatures, preferably under vacuum or in an inert atmosphere. Although the conditions can vary widely depending on the reactants employed, temperatures from 0° C. to 300° C. and a vacuum of up to about $10^{-5}$ torr have been found suitable.

The poly(2,5-thienylene vinylene) and poly(2,5-furanylene vinylene) polymer films were coherent and showed no voids at magnifications up to 5000 times.

The electrical properties of the polymers of the present invention may be altered as desired by addition of suitable dopants known in the art. The dopants can be added by conventional techniques such as by chemical or electrochemical doping. Both p and n type dopants can be employed. Ferric chloride, arsenic pentafluoride and sulphur trioxide are examples of p type dopants whereas the alkali metals lithium and sodium exemplify n type dopants.

The present invention is further illustrated by the following Examples. However, this invention includes variations, modifications and equivalent embodiments which fall within the spirit of this disclosure.

EXAMPLE 1

(a) Preparation of 2,5-Bis(bromomethyl)thiophene [$X=S$, $R_1=R_4=H$; $Y=Br$ in Formula III]

58.3 mls aqueous formaldehyde (37% w/v), and 14.3 mls concentrated hydrobromic acid were placed in a 250 ml 2-necked round-bottomed flask. Dry hydrogen bromide gas was bubbled through the aqueous solution at 0° C. (using ice-water as coolant) until saturation was complete (approx 1 hour). 20 grams of thiophene (0.238 moles) was added dropwise over 15 minutes with stirring at 0° C. during which time a brown oily phase began to separate at the bottom. Stirring was maintained for a further 15 minutes before the oily phase was allowed to settle and the upper aqueous phase was decanted. The oil was washed with 50 mls water, then placed in a freezer at −30° C. This procedure induced crystallisation (fawn crystals). The product was recrystallised in 40°–60° petroleum ether. Gas chromatographic mass spectrometry results indicated that the fawn crystals were pure 2,5-bis(bromomethyl)-thiophene and this was confirmed by IR spectroscopy.

(b) Preparation of Thiophene 2,5-Bis(methyl diethylsulphonium bromide) [$R_1=R_4=H$; $R_2=R_3=C_2H_5$; $X=S$; $Y=Br$ in Formula (IV)]

2.4 g 2,5-bis(bromomethyl)thiophene (III) was dissolved in 18 mls of methanol under nitrogen. 3.9 mls diethyl sulphide (mole ratio thiophene:sulphide=1:4) was added and the reaction was stirred for 3 days at room temperature under nitrogen. Volatile components were removed under vacuum to leave a viscous translucent compound.

(c) Polymerisation of Thiophene-2,5-Bis(methyl diethylsulphonium)bromide)

This product from Example 1(b) above was dissolved in 45 mls of methanol, under nitrogen, in a 3-necked round-bottomed flask. Nitrogen gas was bubbled through the solution for 1 hour to exclude oxygen. In a separate flask, 0.37 grams of sodium hydroxide (1:1 mole ratio sulphonium salt:sodium hydroxide) was dissolved in 45 mls of methanol into which nitrogen gas was bubbled for 1 hour. The sulphonium salt solution was cooled to 0° C. (ice-water bath) and the base solution was added via an air-tight syringe. This produced an immediate colour change to deep yellow. After a reaction time of 15 minutes the reaction was quenched by adding 0.1N methanolic HCl to pH7 (universal indicator paper). The reaction mixture was stored in a 250 ml-2-necked round-bottomed flask under nitrogen at −30° C.

(d) Preparation of Thiophene-2,5-Bis (methyl dimethylsulphonium bromide)

2,5-Bis(bromomethyl)thiophene (6.55 g) was dissolved in chloroform (120 ml) under an atmosphere of nitrogen and cooled to 0° C. Dimethyl sulphide (9.13 ml) was added to the solution and the mixture stirred at 0° C. for 3 h then 20° C. for 16 h. During this period a white precipitate formed, this was filtered off at the end of the reaction under nitrogen to give a solid (6.82 g) which was the thiophene 2,5-bis(methyl dimethylsulphonium bromide) product. The residual brown gum in the flask was dissolved in methanol (50 ml) and added dropwise to chloroform (500 ml), nitrogen was bubbled through the solution throughout the addition. The resulting white solid precipitate was a further aliquot of the product which was recovered by filtration under nitrogen to give a solid (2.25 g).

(e) Polymerisation of Thiophene-2,5-Bis(methyl dimethylsulphonium bromide)

Nitrogen gas was bubbled through distilled water (125 ml) for 45 min to exclude oxygen. The deoxygenated water was added to a 3-necked round bottomed flask containing thiophene-2,5-bis(methyldimethylsulphone bromide) (5.68 g) under an atmosphere of nitrogen. The solution was stirred by a magnetic follower whilst it was cooled to 0° C. over a period of 15 min. 1,5,7-Triazabicyclo[4.4.0]dec-5-ene-polystyrene supported (5.59 g, 2.65 mmol/g) was added to the cool solution to produce an immediate colour change to yellow. After 45 min the now red viscous reaction was terminated by filtration of the polymer supported base. The reaction mixture was stored at 0° C. under nitrogen in a sealed bottle.

(f) Characterisation of Precursor Polymer from 1(e) above

A solution of the precursor polymer was purified by reprecipitation and dissolved in dimethylformamide. The molecular weight distribution of the precursor polymer was measured by Gel Permeation Chromatography and found to be between 20000 and 100000. This meant that the degree of polymerisation of the precursor polymer was between 100 and 550.

(g) Films of Precursor Polymer from 1(e) above

A film was cast on a glass substrate from an aqueous solution of the precursor polymer from (e) above and the cast film allowed to dry overnight in a nitrogen atmosphere.

(h) Thermal Decomposition of the Precursor Polymer Film from 1(g) above to Poly(2,5-Thienylene vinylene)

The film cast in 1(g) above was heated in a vacuum oven at 100° C. for 24 hours. The sample turned from a yellowish-brown film to a black film with a purplish lustre. This film was examined in the Scanning Electron Microscope. A cross-section of the 10 micron film showed it to be solid and coherent with no voids visible at magnifications of 5000 times. Infra-red spectroscopy confirmed the structure of the polymer to be that of poly(2,5-thienylene vinylene) with the following bands:

| cm | Structure |
| --- | --- |
| 3030 | Aromatic thiophene C—H stretch |
| 3010 | Trans vinylic C—C stretch |
| 1660 | Vinylic C=C to thiophene conjugation |
| 1590 | Vinylic C=C to thiophene conjugation |
| 1430 | Thiophene C=C |
| 1280 | Trans vinylene C—H rock |
| 930 | Trans vinylene C—H wag |
| 800 | 2,5 disubstituted thiophene |

EXAMPLE 2—Poly(2,5-Thienylene vinylene)

A thin film of the precursor polymer in Example 1(e) was cast onto an optically flat quartz disc as in Example 1(g) above. This film was left at room temperature for 16 hours as in Example 1(g) above and then heated to 100° C. under dynamic vacuum for 24 hours. The optical absorption spectrum showed the material to have a band gap of 1.7 eV. This contrasts with an optical bandgap of around 3 eV found for poly(phenylene vinylene). The film was then exposed to the vapour above fuming sulphuric acid for 1 hour. During this time the interband absorption between 1.7 and 3 eV decreased in intensity and a mid-gap absorption, initially with a single peak at 1 eV but evolving into peaks at 1.4 and 0.8 eV, was observed. These changes in optical absorption spectrum are consistent with the doping processes commonly found in conducting polymer.

EXAMPLE 3—Poly(2,5-Thienylene vinylene)

A thick film of the precursor polymer in Example 1(e) was cast onto a glass plate and left at room temperature in a nitrogen atmosphere for 24 hours as in Example 1(g) above. It was then heated to 100° C. under dynamic vacuum and held at this temperature for 24 hours. The electrical conductivity of this film was measured by the Van der Pauw technique to be $6 \times 10^{-8}$ S cm$^{-1}$. It was then immersed in a saturated solution of ferric chloride in nitromethane for 30 minutes. The film was washed in fresh nitromethane and dried under dynamic vacuum. The conductivity of this film, which had been doped to 6% was measured to be 15 S cm$^{-1}$.

EXAMPLE 4—Properties of Poly(2,5-Thienylene Vinylene)

The electrochemical properties of the product poly(2,5-thienylene vinylene) were measured by cyclic voltammetry and electrochemical voltage spectroscopy. These experiments showed that the polymer can be doped both n and p type and that the electrochemical band-gap is 1.58 eV. Also the voltages generated in standard cells are low enough to enable high doping levels. This contrasts with poly(phenylene vinylene) where the high electrochemical voltages generated causes degradation of the electrolyte. Thus poly(thienylene vinylene) made in this manner is more suitable for use in batteries.

EXAMPLE 5

(a) Preparation of Furan 2,5-Bis(methyl dimethylsulphonium bromide)

2,5-Dimethylfuran (7.20 g) was dissolved in dry benzene (50 ml) and stirred in an atmosphere of nitrogen at room temperature. To this stirred solution was added N-bromosuccinimide (28.04 g) at a rate designed to keep the reaction temperature at 35° C. When the addition was complete the mixture was stirred maintaining a nitrogen atmosphere for a further 15 min until the temperature fell to near room temperature. The mixture was immediately filtered and the solid was washed with dry benzene (10 ml). The combined solution and washings were transferred to a clean dry flask and stirred in an atmosphere of nitrogen at room temperature. To this solution was added during 5 min dimethyl sulphide (18.60 g). The mixture was stirred for 4 h at room temperature in a nitrogen atmosphere and then filtered quickly to give a solid. This solid was immediately put in fresh dry benzene (150 ml). After thorough washing the benzene was decanted off and the solid was allowed to dry in a stream of dry nitrogen to give furan-2,5-bis(methyl dimethylsulphonium bromide) (12.18 g).

(b) Polymerisation of Furan-2,5-Bis(methyl dimethylsulphonium bromide) to the Precursor Polymer (i) Furan-2,5-bis(methyl dimethylsulphonium bromide) (4.87 g) was added to methanol (85 ml) and stirred at room temperature in a nitrogen atmosphere. It was then filtered and the clear solution was stirred and cooled to 0° C. while bubbling nitrogen therethrough for 1 hour.

In a separate flask, sodium hydroxide (0.515 g) was dissolved in methanol (65 ml). This solution was kept at room temperature whilst nitrogen was bubbled therethrough for 1 hour.

The sodium hydroxide solution was then added under nitrogen to the stirred solution of the dimethyl sulphonium salt at 0° C. The rate of addition was such that the reaction temperature was maintained from 0° to +5° C. After the addition was complete, the solution was stirred for a further 30 mins at 0° C. before being neutralised to pH 7 with 0.1N HCl in methanol to give a solution of the precursor polymer of furan-2,5-bis(methyl dimethylsulphonium bromide) in methanol.

(ii) Furan-2,5-bis(methyl dimethylsulphonium bromide) (0.378 g) was dissolved in distilled water (13.3 ml). This solution was stirred and cooled to 0° C. while bubbling nitrogen therethrough for 1 hour.

1,5,7-Triazabicyclo[4.4.0]dec-5-ene (TBD) bound to polystyrene and containing ca 3.2 mmol of TBD/g resin (0.3125 g) was kept under nitrogen and then added during 5–10 mins to the stirred solution of the dimethyl sulphonium salt at 0° C. under nitrogen atmosphere. After stirring for 4 hours at 0° C. the mixture was filtered to give a light brown clear solution of the precursor polymer of furan-2,5-bis(methyl dimethylsulphonium bromide).

(c) Preparation of Poly(2,5-furanylene vinylene)

A solution of the precursor polymer from Example 5(b)(i) above in methanol (12 ml) was placed in a glass tube (diameter 22 mm) and held under vacuum (1 mbar) at room temperature until all the solvent methanol had evaporated. Therefore a brown film was left on the walls of the tube which was converted to a film of poly(2,5-furanylene vinylene) by heating at 100° C. for 16 hours under dynamic vacuum.

EXAMPLE 6—Properties of Poly(2,5-furanylene vinylene)

A film of the precursor polymer for poly(2,5-furanylene vinylene) was cast onto glass substrate and the solvent allowed to evaporate under a dry nitrogen atmosphere at room temperature. It was then heated under vacuum for 16 hours at 100° C. The colour changed from a pale brown to a deep black. The conductivity of the film was measured to be $8 \times 10^{-8}$ S cm$^{-1}$ at room temperature. The film was then exposed to the vapour above fuming sulphuric acid for 4 days. The room temperature conductivity was measured to be 0.1 S cm$^{-1}$.

We claim:

1. A conductive high molecular weight heterocyclic polymer with band gaps below 2.5 eV in which the repeating unit is of the formula (I):

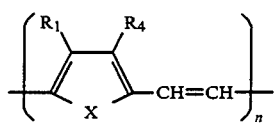

(I)

wherein X is an oxygen atom; $R_1$ and $R_4$ are the same or different substituents selected from H, a $C_1$-$C_4$ alkyl, a carbonitrile, a halide, a trihalomethyl and a phenyl group and n has a value greater than 10.

2. A polymer according to claim 1 wherein said polymer is poly(2,5-furanylene vinylene).

3. A conductive high molecular weight heterocyclic polymer with band gaps below 2.5 eV in which the repeating unit is of the formula (I):

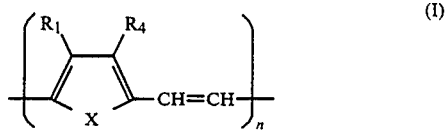

(I)

wherein X is an oxygen atom; $R_1$ and $R_4$ are the same or different substituents selected from H, a $C_1$-$C_4$ alkyl, a carbonitrile, a halide, a trihalomethyl and a phenyl group, n has a value greater than 10, and wherein said polymer is in the form of a coherent film which shows no visible voids at magnifications up to 5000 times.

* * * * *

UNITED STATES PATENT AND TRADEMARK OFFICE
CERTIFICATE OF CORRECTION

PATENT NO. : 4,808,681
DATED : February 28, 1989
INVENTOR(S) : Kevin Harper and William J. W. Watson It is certified that error appears in the above-identified patent and that said Letters Patent is hereby corrected as shown below:

Col. 6, l. 34/35, should read "bis(methyldimethylsulphon<u>ium</u>".

Col. 8, l. 56 should read "There<u>after</u>".

Signed and Sealed this

Third Day of October, 1989

*Attest:*

DONALD J. QUIGG

*Attesting Officer*   Commissioner of Patents and Trademarks